PatentNumber: 5,837,630

Date of Patent: Nov. 17, 1998

[54] HIGH SURFACE AREA MESOPOUROUS DESIGEL MATERIALS AND METHODS FOR THEIR FABRICATION

[75] Inventors: Lynne Owens, Ann Arbor; Levi T. Thompson, Jr., Northville; Michael R. Wixom, Ann Arbor, all of Mich.

[73] Assignee: T/J Technologies Inc., Northville, Mich.

[21] Appl. No.: 741,674

[22] Filed: Oct. 31, 1996

Related U.S. Application Data

[60] Provisional application No. 60/006,095 Oct. 31, 1995.
[51] Int. Cl.⁶ .................................................. C04B 38/00
[52] U.S. Cl. ................................ 501/80; 501/87; 501/96; 501/103; 423/335; 423/338; 502/439; 252/62.2; 361/504; 361/525; 361/526; 204/414; 429/190
[58] Field of Search .......................... 252/62.2; 204/414; 429/190; 502/439; 361/504, 526, 525; 423/335, 338; 501/80, 87, 96, 103

[56] References Cited

U.S. PATENT DOCUMENTS

| 5,260,855 | 11/1993 | Kaschmitter et al. | 361/502 |
|---|---|---|---|
| 5,342,431 | 8/1994 | Anderson et al. | 95/45 |
| 5,399,535 | 3/1995 | Whitman | 501/80 |
| 5,529,971 | 6/1996 | Kaschmitter et al. | 502/416 |
| 5,556,892 | 9/1996 | Pekala | 521/181 |

*Primary Examiner*—Bruce F. Bell
*Attorney, Agent, or Firm*—Gifford, Krass, Groh, Sprinkle, Patmore, Anderson & Citkowski, P.C.

[57] ABSTRACT

Mesoporous desigels are fabricated as nitrides, carbides, borides, and silicides of metals, particularly transition metals, and most particularly early transition metals. The desigels are prepared by forming a gel of a metallic compound, and removing solvent from the gel. In some instances, the thus produced desigel may be further reacted to change its composition, while preserving its mesoporous structure. The materials are particularly suited as electrodes for capacitors, including ultracapacitors, and for batteries.

20 Claims, 2 Drawing Sheets

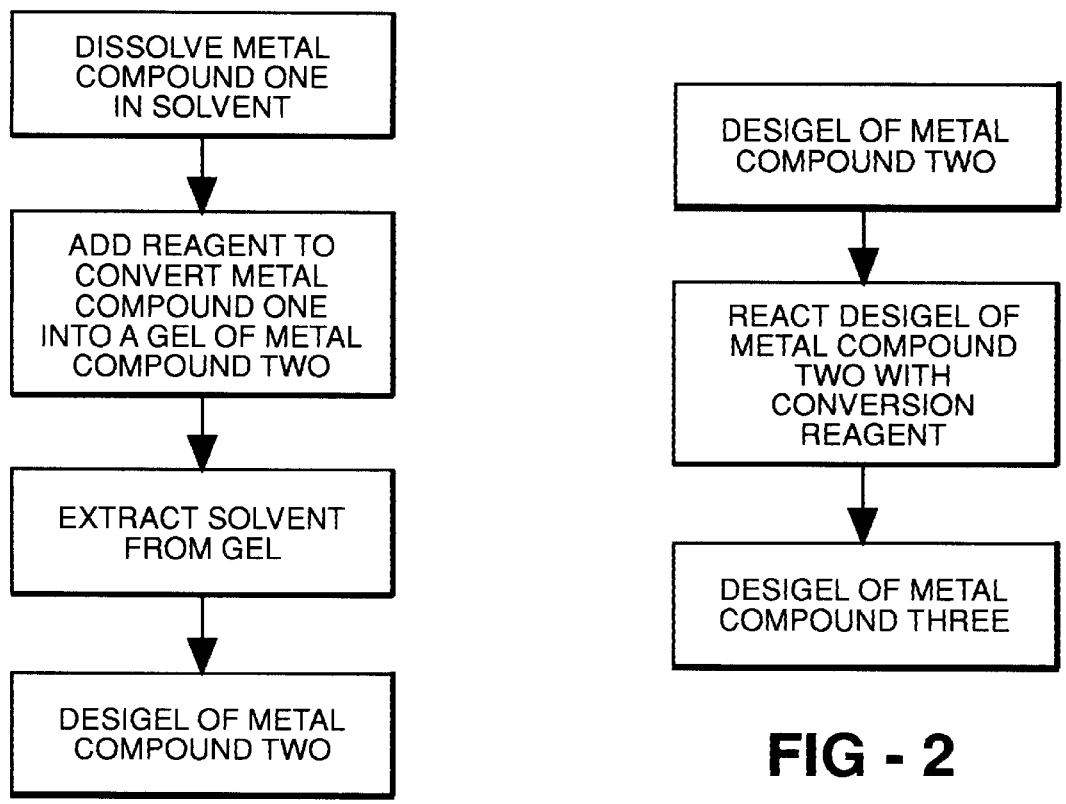
FIG - 1
FIG - 2
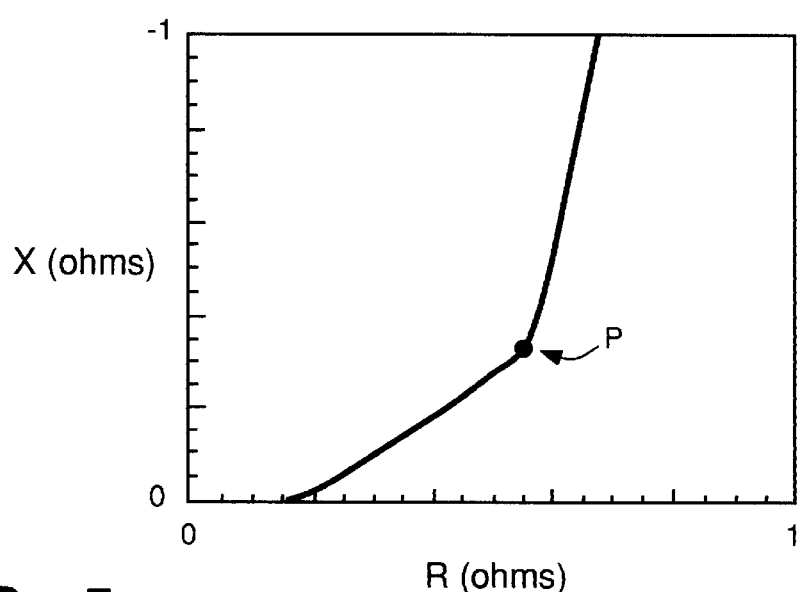
FIG - 5

HIGH SURFACE AREA MESOPOUROUS DESIGEL MATERIALS AND METHODS FOR THEIR FABRICATION

RELATED APPLICATION

This application claims the priority of provisional patent application 60/006,095 filed Oct. 31, 1995.

FIELD OF THE INVENTION

This invention relates to high surface area materials, and particularly to mesoporous desigel materials obtained by the removal of solvent from gels. More specifically the invention relates to mesoporous desigel materials comprised of nitrides, carbides, borides and/or silicides of metals as well as to methods for the fabrication of the materials and to devices incorporating the materials.

BACKGROUND OF THE INVENTION

Surface area is an important, if not necessary property of materials used in a number of devices such as capacitors, including ultracapacitors, supercapacitors and pseudocapacitors, as well as batteries, catalysts, fuel cells and sensors. Therefore, there is a need for high surface area materials which are electrically conductive and which can be configured into electrodes for such devices. Additionally, the material should be physically and chemically stable and easy to fabricate.

Temperature programmed reactions have been previously employed for the production of high surface area metal nitride and carbide materials. In such processes, carefully controlled reaction conditions are used to convert appropriate precursors into carbides or nitrides. In order to succeed, this approach requires that the nitride or carbide have a higher mass density than the precursor, and since only selected materials meet this criterion, the technique is of limited utility.

Another approach to fabrication of high surface area electrodes involves consolidation of very fine powders generated by processes such as ball milling or plasma spray. This approach is complicated by the difficulty of controlling particle size and surface contamination. In addition, particle aggregation can lead to difficulties in processing of the materials, and the milling processes themselves can be very time and energy consuming when hard, refractory compounds such as metal nitrides, carbides, borides or silicides are being prepared. It has been found that the electrical performance of devices based on consolidated powders is often limited by interparticle electrical resistance, and this requires the addition of conductivity enhancing additives or specialized processing steps.

Another approach to the fabrication of high surface area materials involves the chemical or electrochemical etching of metals to produce textured metal or metal oxide surfaces. Since this is a subtractive process, it generates a waste metal solution, giving rise to economical and ecological problems. Additionally, etching techniques often do not afford good control of microstructure, and such processes are typically limited to the fabrication of relatively thin surface layers.

A number of gel based techniques have been investigated in connection with the preparation of high surface area materials. As is known, a gel is comprised of a three-dimensional matrix or network of a first material disposed in a solvent. If the solvent is appropriately removed from the gel, a high surface area material, defined by the matrix, will be produced. The problem in implementation of this technique is that the matrix will often collapse, as a result of rapid or uncontrolled drying and/or surface tension produced by the solvent within the pores of the matrix. It has been found that the matrix may be substantially preserved if such forces are minimized, for example by use of supercritical extraction techniques wherein the solvent is removed while in its supercritical state thereby eliminating surface tension. In other instances, it has been found that by appropriate choice of materials, solvents and drying conditions, the matrix may be preserved even when the solvent is not supercritically extracted.

When the gel matrix is substantially preserved, the resultant material is termed an aerogel, since it can be considered to comprise a gel in which the solvent has been replaced by the ambient atmosphere. In other instances, drying of the gel will result in some collapse of the matrix structure, and such materials are generally referred to in the art as xerogels. Generally, high surface area materials prepared by drying of gels may comprise aerogel and xerogel domains, and within the context of this disclosure all such materials based upon dried gels, be they aerogels, xerogels or mixtures, are referred to herein as desigels.

As will be described hereinbelow, the materials of primary interest in the present invention are those desigel materials having pore sizes in the range of 1–100 nanometers, and in a preferred embodiment, 2–50 nanometers. Within the context of this disclosure, such materials are referred to as mesoporous materials so as to differentiate them from those in which the pore size is primarily smaller or larger. It is to be understood that in some instances, a mesoporous material may also include some finer or coarser pored structure, although the dominant pore features, in terms of material properties and performance will be in the mesoporous range, and all such materials are referred to herein as mesoporous.

A large body of work has been carried out directed to the preparation of oxide based aerogels, primarily involving oxides of silicon, titanium or aluminum which are employed for thermal insulation. Such materials are of very low electrical conductivity, and are not suitable for electrode application without subsequent processing. One approach to the fabrication of high surface area electrodes from aerogel based materials involves the use of an oxide based aerogel as a template for the growth of an electrically conductive tungsten carbide film thereupon by thermal decomposition of tungsten carbonyl upon the oxide aerogel surface. This process is time and labor intensive, and since the bulk of the resultant material is still oxide, the gravimetric and volumetric efficiency of electrodes produced thereby is low. Another approach to the fabrication of high surface area electrodes involves the preparation of carbon based aerogel and xerogel electrodes from polymer gels which are dried and pyrolyzed. Electrodes of this type are disclosed, for example in U.S. Pat. No. 5,529,971. While materials thus produced have very high surface areas, high processing temperatures are required, and this limits the utility of the process. Also the carbon has a fairly low electrical conductivity, and devices such as capacitors and batteries produced therefrom have a low energy density.

It would be desirable to fabricate high surface area desigel based material from high efficiency electrode materials such as transition metal carbides, nitrides, borides and silicides. As will be described hereinbelow, the present invention provides for the manufacture of mesoporous, metal based, desigel materials by a process which is simple and economical to implement. These materials have utility as electrodes for batteries, capacitors, electrochemical cells and the like.

They also may be employed as catalysts including electrocatalysts as well as nonelectrocatalysts, and have utility in sensor devices and the like. These and other advantages will be readily apparent from the drawings, discussion and description which follow.

BRIEF DESCRIPTION OF THE INVENTION

There is disclosed herein a mesoporous desigel. The desigel is fabricated from metallic nitrides, carbides, borides and silicides either singly or in combination. The desigel material is preferably fabricated from a transition metal, and preferably a group IIIb to group VIIb metal, with the group IVb to VIb metal being most preferred. The pore size of the material is typically in the range of 1–100 nanometers, and in a specific embodiment is in the range of 2–50 nanometers. The desigel comprises aerogel and/or xerogel materials, and preferably has a surface area in the range of 20–1,000 square meters per gram.

The present invention is directed to a method for making the mesoporous, desigel. In accord with the method, a solution containing a first compound of a metal is reacted, as for example by hydrolysis or aminolysis to produce a second compound of that metal. The reaction is carried out in solution so that a gel is produced which is comprised of a network of the second compound of the metal embedded in the solvent. The solvent is then removed from the gel while maintaining at least some of the structure of the network, and in this manner a mesoporous desigel is produced. In some instances, the solvent may be removed by supercritical extraction.

In accord with the present invention, the desigel produced by this process may be further reacted to change its character. For example, the desigel may originally be an oxide based material and it may be reacted with a nitrogen or carbon containing gas to convert it to the carbide, nitride, silicide or boride of the metal. The desigel material may be directly fabricated onto a support member so as to provide a finished electrode, or the material may be fabricated in bulk and subsequently affixed to an electrode support.

In accord with specific embodiments of the present invention there is provided an electrical device, such as a capacitor, battery, electrochemical cell or the like in which at least one of the electrodes is fabricated from the desigel material of the present invention.

BRIEF DESCRIPTION OF THE DRAWINGS

FIG. 1 is a flow chart illustrating the basic steps in a process for the fabrication of the materials of the present invention;

FIG. 2 is a flow chart illustrating the steps for the conversion of a first desigel material fabricated in accord with the present invention to a second desigel material;

FIG. 5 is a Nyquist plot for the vanadium nitride sample of FIGS. 3 and 4.

DETAILED DESCRIPTION OF THE INVENTION

Figure 3:
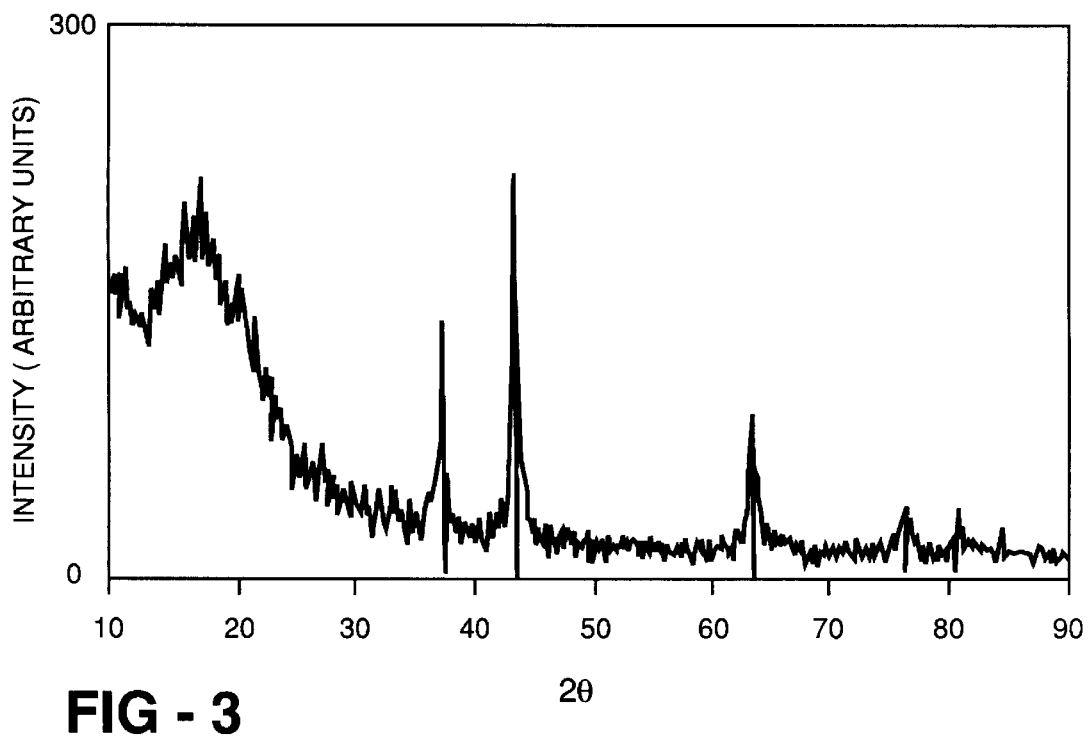
FIG. 3 is a depiction of the x-ray diffraction pattern for a particular vanadium nitride desigel made in accord with the present invention.

The present invention is directed to mesoporous materials based upon desigels. The materials have good electrical conductivity and are advantageously employed as electrodes for electrochemical energy storage and conversion, as well as for other applications. The materials are based upon nitrides, carbides, borides and silicides of metals taken either singly or in combination. Preferred metals are the transition metals, with the early transition metals, namely those of groups IIIb to VIIb, being particularly preferred, and the metals of groups IVb to VIb being most preferred. It should be noted that various conventions have been employed in connection with the designation of the various groups of the periodic table, and within the context of this disclosure groups IIIb-VIIb all comprise transition metals. As described above, these materials are mesoporous and have very high surface areas, typically in the range of 20 to 1,000 $m^2/g$.

Within the context of the present invention, these electrically conductive desigel materials may be prepared by a direct process wherein a gel of the desired material is prepared and subsequently dried to produce a desigel; alternatively, the materials may be prepared by an indirect process wherein a desigel of a first material is prepared and subsequently converted to the desired mesoporous material by one or more treatment steps. The synthesis of the materials of the present invention will be explained generally with reference to FIGS. 1 and 2 hereinbelow, and specific, illustrative examples will follow.

Referring now to FIG. 1, there is shown a flow chart illustrating the basic steps in the preparation of the material of the present invention. In the first step of the process, a metal compound, designated metal compound 1 (MC1) is dissolved in a solvent. In a second step, a reagent is added to the solution and reacts with MC1 to convert it to a gel of a second compound of the metal (MC2). This gel is comprised of a network of MC2 embedded in the solvent. In the third step, the solvent is extracted from the gel so as to yield the desigel. As noted above, the solvent may be removed by a supercritical extraction, in which instance a material which is primarily an aerogel will be prepared. Alternatively, nonsupercritical drying may be employed, and such materials are typically xerogels, although some aerogel material may be produced under such circumstances.

If a direct synthesis method is employed, the desigel which is the result of the FIG. 1 procedure is the finished product. However, in some instances it may be desirable to convert the thus fabricated desigel to a mesoporous desigel of a different composition. A conversion process of this type is illustrated with reference to FIG. 2.

Shown in FIG. 2 is a flow chart of a conversion process wherein the desigel of MC2 is further reacted with a conversion reagent to convert it into a desigel of metal compound 3 (MC3). A process of this type may be employed, for example, to convert a metal oxide desigel into a metal nitride, carbide, boride or silicide desigel, or to convert a nitride desigel into a carbide desigel. Clearly, still further conversion steps yielding further desigels of metal compounds (e.g., MC4, MC5) may be implemented within the scope of this invention.

The exact reagents and reaction conditions employed in the processes illustrated in FIGS. 1 and 2 will depend upon the materials being prepared. For example, if an oxide based desigel is being prepared in the FIG. 1 process, MC1 may comprise a metal alkoxide such as, for example, a metal ethoxide. A typical solvent in this case would be an alcohol such as ethanol. The conversion reagent in this instance will preferably comprise water, or some other such solvent capable of hydrolyzing the alkoxide. Typically, the reaction is carried out under highly dilute conditions, and a small amount of acid or base is generally added to catalyze the hydrolysis. Under such reaction conditions, the metal alkoxide will hydrolyze and condense to form a gel in which the water and alcohol comprise the solvent. Extraction of the solvent yields a metal oxide desigel. The electrical conductivity of most oxide materials is too low for most electrode applications, and in accord with the present invention the oxide material is converted to a more conductive material such as a carbide, nitride, silicide or boride, by means of a conversion reagent. For example, the oxide may be converted to a nitride by treating it with ammonia or the like at elevated temperatures. Likewise, a nitride may be converted to a carbide by treatment with a carbon containing gas such as methane. Similar reactions may be carried out using silanes or boranes as conversion reagents.

In a direct synthesis process, MC1 is a material which is capable of directly reacting in solution to yield the desired final product. For example, it has been found that metal alkyl amide precursors may be reacted with ammonia or an amine to produce a gel of the metal nitride which can be dried to produce the mesoporous material. In some instances, MC1 can be generated and reacted in situ to form MC2, as for example by electrochemical synthesis of MC 1 from a metal electrode disposed in an appropriate solvent/reagent mixture.

EXPERIMENTAL

The principles of the present invention will be illustrated with reference to the following nonlimiting examples.

EXAMPLE 1

In this example, a mesoporous niobium nitride material was prepared by an indirect process. In the first stage of the process a niobium oxide desigel was prepared from niobium ethoxide ($Nb(OC_2H_5)_5$). The preparation was carried out in an ethanol solvent, which is present in a molar amount of approximately 40:1 to the niobium ethoxide. Water, at a molar ratio of approximately 5:1 to the niobium ethoxide, was utilized as the reactant. The niobium ethoxide was dissolved in approximately half of the alcohol and the remaining portion used to dilute the water. The water solution was slowly added to the precursor solution while stirring. A small amount of acid was added to catalyze the hydrolysis and condensation reactions. Under these conditions, the solution turned to a clear gel at room temperature within a few minutes. The ethanol was supercritically extracted in a 300 ml Parr pressure vessel at 270° C. and 1,500 psi. This resulted in the production of a niobium oxide aerogel having a surface area in excess of 400 $m^2/g$ and a peak in the pore size distribution at 30–50 nm.

In a second stage of this experiment, the oxide was converted to a nitride. This conversion was accomplished by placing the niobium oxide material onto a quartz wool plug which was supported on a frit inside a reactor which was comprised of an approximately 1 inch diameter fused silica tube. The tube was placed in a furnace, which was controlled by a programmable temperature controller, and ammonia was passed through the tube. The ammonia gas flow rate was adjusted to a flow rate of 200 ccm and the nitride material was prepared by heating the reactants from room temperature to the final reaction temperature of 700° C. at a heating rate of 60° C. per hour. The materials were held at the final reaction temperature for one hour and then cooled to room temperature and passivated by flowing a mixture of approximately 1% oxygen in helium, at a rate of 50 ccm of the mixture for 1 hour. X-ray diffraction analysis confirmed that the only crystalline phase present in the final product was NbN. Sorption analysis yielded a single point BET surface area of 134 $m^2/g$ for this material. The pore size distribution peak was in the range of 80–100 nm.

EXAMPLE 2

In this example, niobium carbide material was prepared by an indirect process. In a first stage of the preparation, niobium oxide was prepared as described above, and in a second stage reaction, the oxide was converted to the carbide. To accomplish the conversion, approximately 0.3–0.6 grams of the niobium oxide precursor was supported on a quartz wool plug and loaded into a controlled atmosphere tube furnace of the type described with reference to Example 1. A 50:50 volume percent ratio of methane:hydrogen was used as the reactant gas at a flow rate of 2,000 ccm. The sample was ballistically heated from room temperature to 300° C. over 30 minutes. The sample was then heated at 180° C./hour to a peak temperature of 800° C. The sample was then cooled to room temperature and passivated under a flowing 1% mixture of oxygen and helium for one hour. X-ray diffraction analysis of this product indicated NbC as the only crystalline constituent, and sorption analysis indicated a surface area of 80 $m^2/g$ with a broad distribution of pore sizes with a substantial proportion of the pores being in the range of 2 nm to 100 nm.

EXAMPLE 3

In this example niobium carbide was prepared from niobium oxide via a nitride intermediate. In first stage of the preparation, niobium oxide was prepared as detailed in Example 1, and in a second stage reaction, this oxide was converted to the nitride, also in accord with Example 1 procedure. The thus prepared nitride was converted to carbide by a temperature programmed reaction, carried out in an apparatus as described with reference to previous examples, utilizing an equimolar mixture of methane and hydrogen at a flow rate of 200 ccm. The sample was heated from room temperature to 800° C. at 60° C./hour in the methane-hydrogen mixture, and held at 800° C. for 30 minutes under pure hydrogen, at a flow rate of 100 ccm. The material was cooled to room temperature and passivated with a 1% mixture of oxygen in helium for one hour. X-ray diffraction analysis of this product indicated NbC as the only crystalline constituent. Sorption analysis indicated a surface area of 112 $m^2/g$ with a substantial fraction of the pores having a diameter larger than 10 nm, and a peak in the pore size distribution at 90–100 nm. It has been found that when niobium carbides are formed from an oxide, via an intermediate nitride, the thus produced materials have more beneficial microstructures than do carbides produced directly from the oxides.

EXAMPLE 4

In this example, vanadium nitride was prepared in an indirect process from a vanadium oxide desigel. In a first stage, vanadium oxide gels were prepared utilizing vanadium n-propoxide ($VO(OC_3H_7)_3$). The solvent was n-propanol, and it was present in a molar ratio of approximately 21:1 with the vanadium alkoxide. Water, in a molar amount of 3:1 with the alkoxide was used as the reagent. As in the previous examples, the alkoxide was dissolved in approximately half of the alcohol and the remaining portion used to dilute the water. The water solution was slowly added to the precursor solution while stirring, and under these conditions the solution turned into a dark orange gel at room temperature within a few minutes. The n-propanol was supercritically extracted in a 300 ml Parr pressure vessel at 250° C. and 1500 psi with approximately 150 ml of excess ethanol. The surface area of the thus produced vanadium oxide desigel was greater than 300 m$^2$/g with a peak in the pore size distribution at 20–30 nm.

Figure 4:
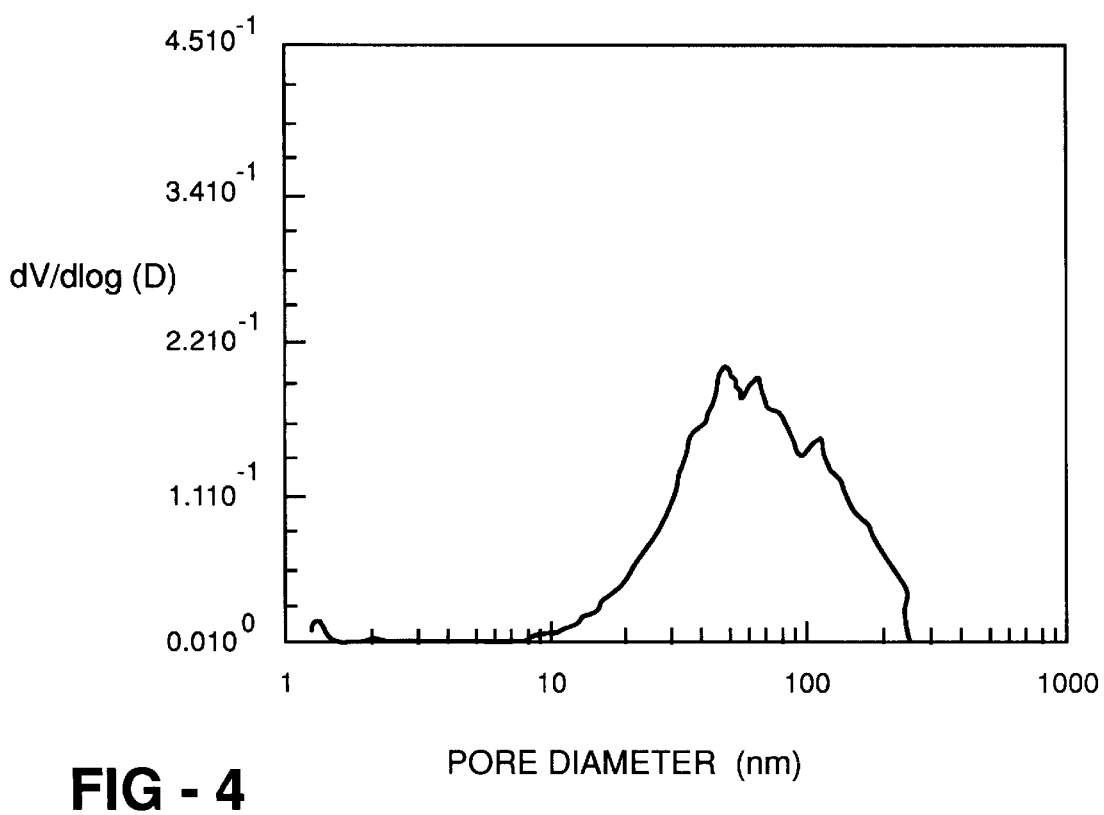
FIG. 4 is a graphic representation of the pore size distribution of the vanadium nitride material of FIG. 3.

The vanadium oxide was converted to the nitride utilizing the procedure and apparatus of the previous examples. Approximately 0.1 gram of the oxide was packed onto a quartz wool plug and supported on a frit inside the tube. Ammonia, at a space velocity in excess of 2,000 ccm, was flowed through the tube, and the reactants heated to the final reaction temperature of 660° C. at a heating rate of 60° C./hour, and held at final reaction temperature for 1 hour. The materials were then cooled to room temperature and passivated in a 1% oxygen in helium atmosphere which was flowed therethrough at the rate of 50 ccm for 1 hour. X-ray diffraction was used to confirm that the only crystalline phase present in the product was vanadium nitride, and the data from this measurement is presented herewith in FIG. 3. Sorption analysis yielded a single point BET surface area of approximately 200 m$^2$/g, and the pore size distribution had a peak at approximately 50 nm as is shown in FIG. 4. Electrodes were prepared from this material and further evaluated in an ultracapacitor configuration, and were found to have a charge storage capacity of 54 F/g and were stable over 650 mV in 4.5M sulfuric acid electrolyte. FIG. 5 is a Nyquist plot for the thus prepared vanadium nitride material. The plot was developed for a device based on three pairs of 350 mg electrodes which were 0.75 inches in diameter. The plot is consistent with an electrode having both high capacitance and a porous network. The knee of the FIG. 5 curve, designated by point P, represents the response at 0.35 Hz.

EXAMPLE 5

In this example, electrodes were prepared from the high surface area, mesoporous niobium carbide material previously described. In order to prepare the electrodes, the powder was mixed with approximately 10% by weight of a powdered Teflon binder disposed in an aqueous suspension. The electrode/binder mixture was blended for 2 minutes in a laboratory blender and a small amount of isopropanol was added as needed to maintain liquid consistency. The electrode/binder mixture was separated from the liquid phase by filtration, and the resultant material kneaded and rolled into progressively thinner cakes eventually forming a layer of approximately 0.010 to 0.015 inch thickness. A nickel mesh current collector was pressed into the layer and the mesh/electrode/binder assembly was consolidated by uniaxial pressing at approximately 10,000 psi. The resulting electrode was dried approximately 6 hours at 120° C. to remove water and isopropanol.

The thus produced electrode was evaluated by cyclic voltammetry to determine its charge storage capacitance and electrochemical stability in 4.5M sulfuric acid electrolyte. The capacitance was found to be approximately 26 F/g of electrode material with a stability window of 1.0 V.

EXAMPLE 6

In this example, an electrode is prepared directly upon a substrate by coating the substrate with a gel prior to solvent extraction. Specifically, a nickel foil was dipped into a vanadium alkoxide gel generally similar to that of Example 4, so as to produce a uniform two sided coating. The coated substrate was then supercritically extracted as previously described to produce a uniform vanadium oxide desigel coating on the substrate. The desigel coating on the substrate is then converted from the oxide to the nitride by reaction with ammonia as previously described.

It should be noted that this electrode fabrication process may also be carried out with a direct synthesis methodology of the type which will be described hereinbelow. Also, it should be noted that multiple dips may be employed to build up a thicker layer thereupon.

EXAMPLE 7

In this example, electrodes are prepared by casting a gel onto a support substrate. Casting is accomplished by the use of a simple mold which holds the gel on the substrate and permits a controlled thickness to be retained thereby. By appropriately configuring the mold, a support substrate may be embedded in a block of gel so that both sides are coated with the mesoporous material once solvent extraction has been accomplished. Again, this process may be carried out with both the direct and indirect synthetic methods of the present invention, and in this procedure, as in the other procedures, the electrode substrates may comprise foils, mesh or other such bodies.

EXAMPLE 8

In this example, a titanium nitride xerogel was directly synthesized. The starting material comprised tetrakis (diethylamino)titanium and n-butylamine was the aminolysis reagent as well as the primary solvent. The material was prepared under a nitrogen atmosphere, in a Schlenk system. The molar ratio of the amine to the amide was approximately 15. Addition of the amine resulted in a precipitate, but the precipitate redissolved when the mixture was heated to reflux while under the nitrogen atmosphere. The mixture was cooled to room temperature and a portion of the n-butylamine was evaporated under flowing nitrogen until the mixture was viscous. The resulting semisolid compound was placed in a drybox and allowed to dry under ambient conditions to produce a TiN xerogel. The xerogel was a yellow solid which was x-ray amorphous, even after annealing at 400° C. in nitrogen. The surface area of the material was measured after exposure to air and was found to be in the range of 1–10 m$^2$/g. The average pore sizes of materials prepared in accord with the foregoing was found to vary from 8 to 35 nm depending on processing conditions. The materials that were not exposed to air prior to sorption analysis had average pore sizes of less than or equal to 10 nm while material which was exposed to air had an average pore size of approximately 33 nm.

EXAMPLE 9

In this example, titanium nitride aerogels were prepared. Reactants and reaction conditions were as in Example 8, except that following gel formation, the n-butylamine solvent phase was replaced with n-propylamine which was then extracted under supercritical conditions. The solvents were exchanged since n-propylamine has a lower critical temperature and pressure (224° C. and 688 psi) than n-butylamine. During supercritical extraction, the pressure and temperature were increased to just above the critical points and held there for about 2 hours, then the supercritical fluid was incrementally evacuated from the pressure vessel and replaced with dry nitrogen prior to cooling the product to room temperature. The resulting extracted gel was annealed in flowing nitrogen at temperatures of up to 400° C. The titanium nitride aerogel thus produced was yellow-brown in color and there was no evidence of contamination by oxygen. The single point BET surface area was 691 m²/g, and the sample remained x-ray amorphous even after annealing at 400° C. in nitrogen.

EXAMPLE 10

In this example, aerogels and xerogels of zirconium nitride were directly prepared. In each instance, a starting gel was prepared from tetrakis(diethylamino)zirconium as the precursor and n-butylamine as the aminolysis reagent and primary solvent. Reaction proceeded as in Example 9, and a precipitate formed upon addition of the amine to the amide, but this precipitate dissolved on heating. As in the previous example, a portion of the solvent was evaporated under flowing nitrogen and the resultant semisolid material transferred to a drybox for storage.

Xerogels were prepared by completely evaporating off the solvent under subcritical conditions (typically less than 100° C. and at atmospheric pressure). Aerogels were prepared by first exchanging the n-butylamine with n-propylamine as previously, and then carrying out supercritical extraction as in the previous example. The resulting aerogel was annealed in flowing nitrogen at temperatures of approximately 400° C.

The zirconium nitride xerogels had much higher surfaces than the corresponding titanium nitride xerogels, ranging from 43 to 134 m²/g. Two xerogels were prepared and not exposed to air, and it was found that they had surface areas of 231 and 236 m²/g. All of the zirconium nitride xerogels were x-ray amorphous even after annealing at 400° C., and the average pore sizes were generally similar to those obtained in corresponding titanium nitride xerogels.

The zirconium nitride aerogel was a brown solid which showed no evidence of contamination with oxygen. A series of two samples were measured and found to be 691 and 695 m²/g, and the material remained x-ray amorphous even after annealing at 400° C. in nitrogen.

EXAMPLE 11

It has been found that metal alkylamide precursors can be synthesized by electrochemical oxidation of metal electrodes in alkylamine or liquid ammonia solvents. The products of such electrosynthesis will be oligomeric metal amides. As the synthesis proceeds the viscosity of the solution will increase as the amide concentration increases. Alternatively, the synthesis may be interrupted and the solution concentrated by evaporation of solvent. In either instance, the solution concentration eventually reaches the point at which a gel may be formed, and removal of the solvent can produce a high surface area desigel. In some instances, this approach will be advantageous insofar as it avoids the need to separately obtain precursor alkylamines. Furthermore, the ammonia solvent is relatively amenable to supercritical extraction, since its critical point is closer to ambient than that of many other solvents.

As noted above, the desigels of the present invention may be fabricated to be aerogels, in which instance supercritical extraction is generally required to preserve the structure of the material. In those instances where drying is accomplished under nonsupercritical conditions, xerogels are generally produced. While the xerogels are suitable for a number of applications, in some instances, the very high surface area of aerogels is required, and it is advantageous to be able to manufacture such materials without the need for the complicated processing and equipment entailed by supercritical extraction.

In accord with the present invention, it has been found that the structure of the desigels may be significantly improved so as to be, or closely approximate, that of an aerogel, if an appropriate support is provided for the gel during the drying. It has been found that when the gel is coated onto a high surface area substrate, such as a substrate which has been textured by etching or abrasion, or a substrate which comprises mesh, foam, felt or other high surface area member, the resultant desigel will have a very high surface area. While not wishing to be bound by speculation, it is postulated that the high surface area support matrix retains the gel, by surface attraction, in a manner which counteracts the surface tension of the solvent within the microstructure of the gel thereby preventing pore collapse during drying.

Prom the foregoing, it will be seen that very high surface area materials may be prepared as desigels of nitrides, carbides, borides and silicides of metals. The material may be comprised of a mixture of the metals and/or compounds thereof. It should also be noted that the various compounds comprising the materials of the present invention may be off stoichiometry, but still be within the scope of the invention. These materials typically have a pore size distribution such that the maximum thereof is in the range of 1–100 nm, and this makes these materials particularly well suited as electrodes for capacitors, batteries, sensors and the like. The foregoing drawings, discussion and description were illustrative of particular embodiments of the present invention; however, they are not meant to be limitations upon the practice thereof. In view of the teaching presented herein, numerous modifications and variations will be apparent to one of skill in the art, and all of such are within the scope of the present invention. It is the following claims, including all equivalents, which define the scope of the invention.

We claim:

1. A method of making a mesoporous desigel comprising:
   providing a solution containing a first compound of a metal;
   reacting said first compound in said solution so as to produce a gel comprised of a network of a second compound of said metal embedded in a solvent;
   removing said solvent from the gel while maintaining at least some of the structure of the network of the second compound, whereby a mesoporous desigel of said second compound is produced; and
   reacting said mesoporous desigel so as to convert at least a portion of said second compound to a third compound of said metal.

2. A method as in claim 1, wherein said metal is a transition metal.

3. A method as in claim 2, wherein said transition metal is a group IIIb-VIIb transition metal.

4. A method as in claim 2, wherein said transition metal is a group IVb-VIb transition metal.

5. A method as in claim 1, wherein said second compound is selected from the group consisting of: oxides, carbides, nitrides, borides, silicides, and combinations thereof.

6. A method as in claim 1, including the further step of reacting said third compound of said metal so as to produce a fourth compound of said metal.

7. A method as in claim 6, wherein said third compound of said metal is a nitride, and the fourth compound of said metal is a carbide.

8. A method as in claim 1, wherein the step of reacting said desigel comprises exposing said desigel to a reactive gas at an elevated temperature.

9. A method as in claim 1, wherein said second compound of said metal is an oxide, and said third compound of said metal is a nitride.

10. A method as in claim 1, wherein said first compound of said metal is an alkoxide and wherein the step of reacting said first compound in said solution comprises hydrolyzing said first compound so as to produce a second compound which is an oxide.

11. A method as in claim 1, including the further step of disposing said desigel on a support member.

12. A method as in claim 11, wherein the step of disposing said desigel on a support member comprises coating said support member with the gel prior to the step of removing the solvent from the gel.

13. An electrical device comprising a first electrode, a second electrode spaced from said first electrode, and an electrolyte disposed therebetween, the improvement comprising in combination:

at least one of said electrodes including a mesoporous desigel comprised of a compound of at least one metal, said compound selected from the group consisting of: nitrides, carbides, borides, silicides, and combinations thereof.

14. An electrical device as in claim 13, wherein said at least one metal is a transition metal.

15. An electrical device as in claim 14, wherein said transition metal is a group IIIb-VIIb transition metal.

16. An electrical device as in claim 14, wherein said transition metal is a group IVb-VIb transition metal.

17. An electrical device as in claim 13, wherein said device comprises a capacitor.

18. An electrical device as in claim 13, wherein said device comprises an electrochemical cell.

19. A method of making a mesoporous desigel comprising:

providing a solution containing an alkylamide of a metal;

reacting said alkylamide in said solution, with ammonia or an amine, so as to produce a gel comprised of a network of a nitride of said metal embedded in a solvent; and removing said solvent from the gel while maintaining at least some of the structure of the network of the second compound, whereby a mesoporous desigel of said nitride of said metal is produced.

20. A method as in claim 19, including the further step of electrochemically generating said alkylamide in said solution by reacting a metal electrode with ammonia or an amine.

* * * * *